(12) United States Patent
Egawa et al.

(10) Patent No.: US 8,693,307 B2
(45) Date of Patent: Apr. 8, 2014

(54) WIRELESS COMMUNICATION SYSTEM, TRANSMITTER, RECEIVER AND WIRELESS COMMUNICATION METHOD

(75) Inventors: Hiroyuki Egawa, Fukuoka (JP); Masahiko Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 185 days.

(21) Appl. No.: 13/252,202

(22) Filed: Oct. 4, 2011

(65) Prior Publication Data

US 2012/0207010 A1  Aug. 16, 2012

(30) Foreign Application Priority Data

Feb. 14, 2011  (JP) .................................. 2011-028392

(51) Int. Cl.
*H04J 11/00*  (2006.01)
(52) U.S. Cl.
USPC ............ 370/208; 370/252; 370/328; 370/329
(58) Field of Classification Search
USPC .......... 370/208, 252, 328, 329, 431, 437, 468
See application file for complete search history.

(56) References Cited

U.S. PATENT DOCUMENTS

| | | | | |
|---|---|---|---|---|
| 8,300,680 | B2 * | 10/2012 | Pals et al. ....................... | 375/219 |
| 2011/0051869 | A1 * | 3/2011 | Kim et al. ...................... | 375/350 |
| 2011/0103333 | A1 * | 5/2011 | Berggren et al. ............. | 370/329 |

FOREIGN PATENT DOCUMENTS

JP  2000-307543  11/2000

* cited by examiner

*Primary Examiner* — Huy D Vu
*Assistant Examiner* — Kuo T Chiang
(74) *Attorney, Agent, or Firm* — Fujitsu Patent Center

(57) ABSTRACT

A transmitter transmits a wireless signal produced by allocating data to component carriers for a plurality of communication bands, and a receiver receives the wireless signal and carries out a reception process for the received wireless signal with a predetermined reception sampling frequency are provided, and the component carriers are arranged at such positions that the data do not overlap with each other when the component carriers are superimposed on a frequency axis.

14 Claims, 15 Drawing Sheets

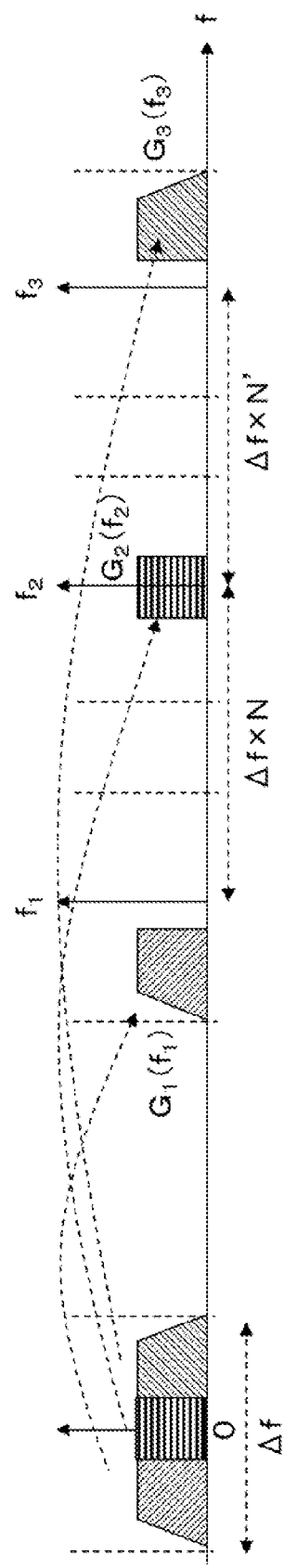

WIRELESS COMMUNICATION SYSTEM, TRANSMITTER, RECEIVER AND WIRELESS COMMUNICATION METHOD

CROSS-REFERENCE TO RELATED APPLICATION

This application is based upon and claims the benefit of priority of the prior Japanese Application No. 2011-028392 filed on Feb. 14, 2011 in Japan, the entire contents of which are hereby incorporated by reference.

FIELD

The embodiments discussed herein are related to a wireless communication system, a transmitter, a receiver and a wireless communication method.

BACKGROUND

At present, standardization of LTE-Advanced (LTE-A) is proceeding in 3GPP (3rd Generation Partnership Project).

In the LTE-A, in order to implement a peak data rate exceeding 1 Gbps, a carrier aggregation technique for carrying out wideband transmission using a plurality of component carriers is adopted.

As illustrated in FIG. 1(A), in the carrier aggregation, a transmitter divides a signal (data) for a receiver into a plurality of signals and carries out an up convert process for the signals obtained by the division (hereinafter referred to sometime as divided signals).

Next, as illustrated in FIG. 1(B), the transmitter allocates the divided signals to a plurality of component carriers $CC_1$ and $CC_2$ having, for example, center frequencies $f_1$ and $f_2$ ($f_1 > f_2 > 0$), respectively, to produce a wireless signal and transmits the produced wireless signal to the receiver.

On the other hand, as illustrated in FIG. 1(C), the receiver receives the wireless signal from the transmitter and carries out a down convert process for the divided signals allocated to the component carriers $CC_1$ and $CC_2$.

Then, as illustrated in FIG. 1(D), the receiver synthesizes the divided signals in the base band to restore and reproduce the signal.

As described above, by using the carrier aggregation, it is possible to bind the component carriers to expand the band.

Incidentally, as illustrated in FIG. 2A, the receiver carries out an analog/digital (A/D) conversion process, for example, in sampling time of $1/\Delta f$ for the signal of a time waveform $g(t)$ received from the transmitter to reproduce the signal. It is to be noted that $\Delta f$ represents a sampling frequency in the A/D conversion process.

Here, when the process just described is observed on a frequency axis, as illustrated in FIG. 2B, a spectrum $G(f)$ that is a result of Fourier transform of the time waveform $g(t)$ is converted into a signal $G'(f)$ superimposed for each band of $\Delta f$. It is to be noted that the bandwidth of the spectrum $G(f)$ in the example of FIG. 2(B) is $2\Delta f$.

Accordingly, as illustrated in FIG. 3, where the receiver carries out sampling of the signals $G_1(f_1)$ and $G_2(f_2)$ allocated to the component carriers $CC_1$ and $CC_2$ with a single sampling frequency, overlapping (refer to a black portion of FIG. 3) in spectrum sometimes appears.

In such a case as just described, the receiver cannot separate the overlapping portion of the spectrum and cannot correctly reproduce an original signal.

SUMMARY (1) According to an aspect of the embodiments, a system includes a wireless communication system including a transmitter that transmits a wireless signal produced by allocating data to component carriers for a plurality of communication bands, and a receiver that receives the wireless signal and carries out a reception process for the received wireless signal with a predetermined reception sampling frequency, and wherein the component carriers are arranged at such positions that the various data do not overlap with each other when the component carriers are superimposed on a frequency axis.

(2) According to an aspect of the embodiments, an apparatus includes a transmitter of wireless communication system which includes the transmitter and a receiver can be used, the transmitter transmitting a wireless signal produced by allocating data to component carriers for a plurality of communication bands, the receiver receiving the wireless signal and carrying out a reception process for the received wireless signal with a predetermined reception sampling frequency, the transmitter including a controlling section that controls center frequencies of the component carriers based on the reception sampling frequency, and a transmission section that transmits a wireless signal produced by allocating data to the component carriers having the center frequencies controlled by the controlling section.

(3) According to an aspect of the embodiments, an apparatus includes a receiver of a wireless communication system which includes a transmitter and the receiver can be used, the transmitter transmitting a wireless signal produced by allocating data to component carriers for a plurality of communication bands, the receiver receiving the wireless signal, the receiver including a reception processing section that carries out a reception process for the received wireless signal with a predetermined reception sampling frequency, and a controlling section that controls a down convert frequency when the wireless signal is to be down converted such that the data do not overlap with each other when the component carriers are superimposed on a frequency axis.

(4) According to an aspect of the embodiments, a method includes a wireless communication method for use with a wireless communication system which includes a transmitter that transmits a wireless signal produced by allocating data to component carriers for a plurality of communication bands and a receiver that receives the wireless signal can be used, the wireless communication method including arranging the component carriers at such positions that the data do not overlap with each other when the component carriers are superimposed on a frequency axis, and carrying out communication using the component carriers arranged at the positions.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 15 is a view illustrating an example of arrangement of component carriers.

DESCRIPTION OF EMBODIMENTS

In the following, an embodiment of the present invention is described with reference to the drawings. However, the embodiment hereinafter described is illustrative to the end, and there is no intention to eliminate various modifications and applications of the technique not specified in the embodiment and modifications hereinafter described. In particular, the embodiment and modifications can be implemented in various modified forms without departing from the scope of the present invention.

[1] Description of Embodiment

(1.1) Example of Configuration of Wireless Communication System

Figure 1:
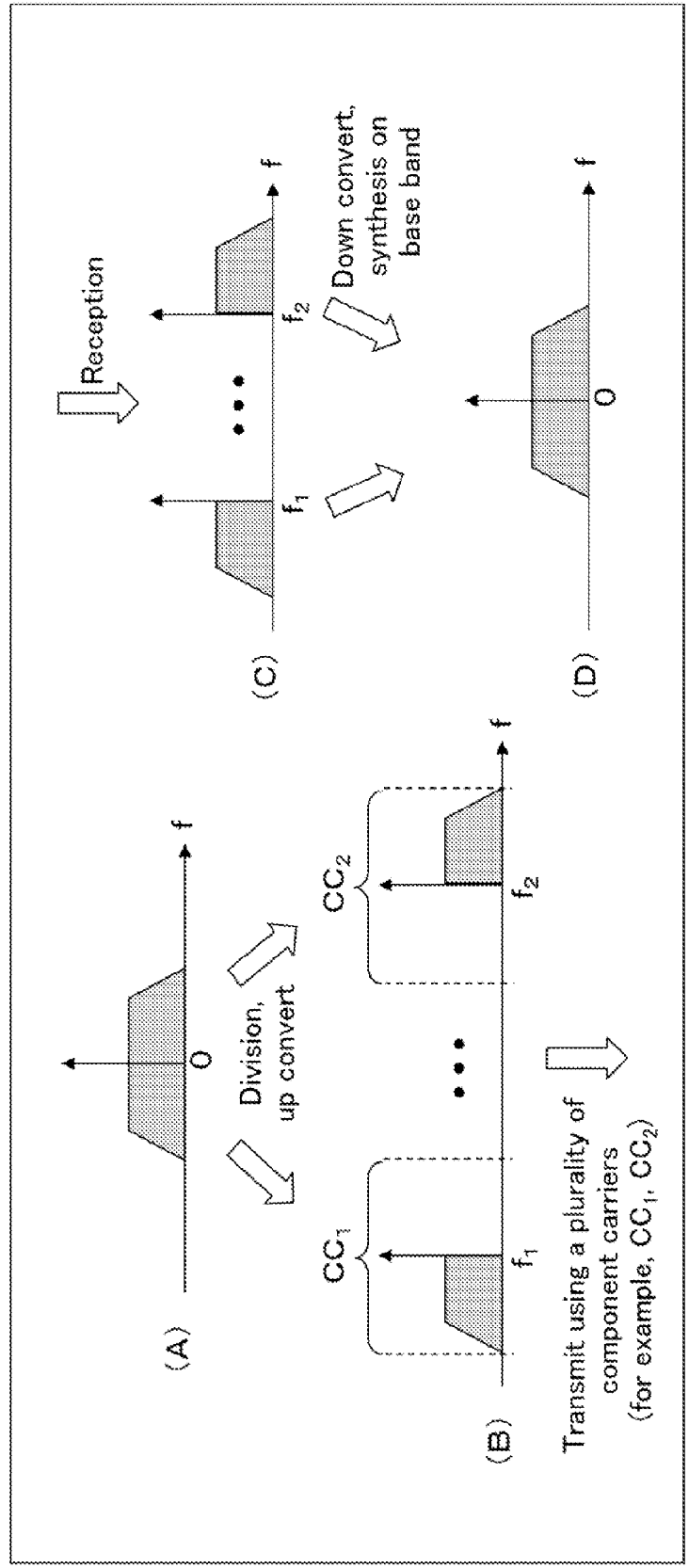
FIGS. 1(A) to 1(D) are views illustrating an example of wireless communication by carrier aggregation.
Figure 2A:
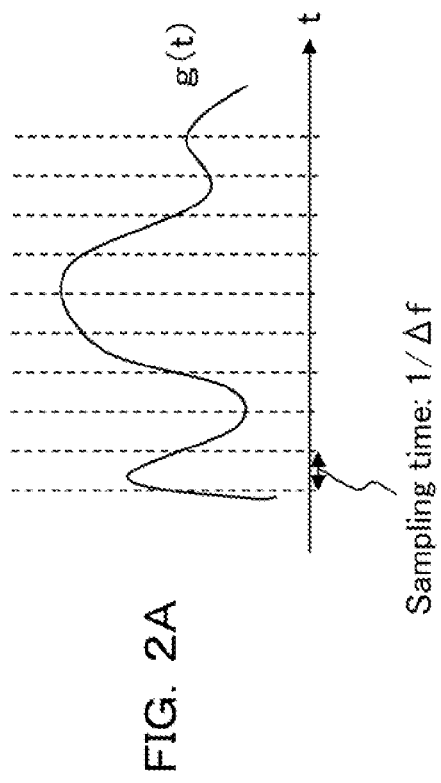
FIGS. 2A and 2B are views illustrating an example of a sampling process.
Figure 2B:
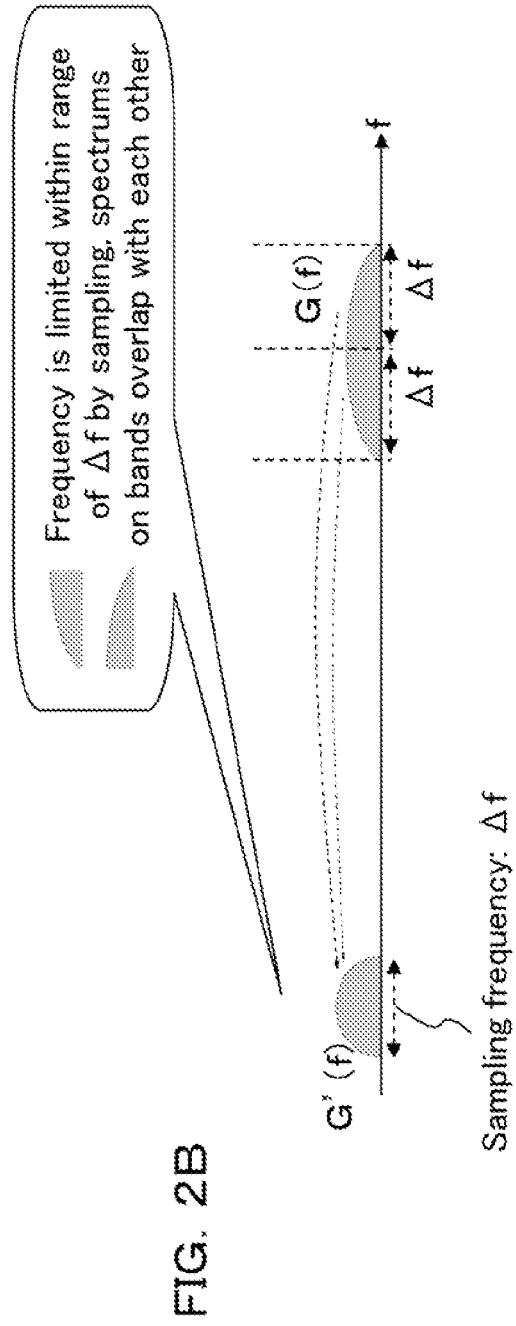
Figure 3:
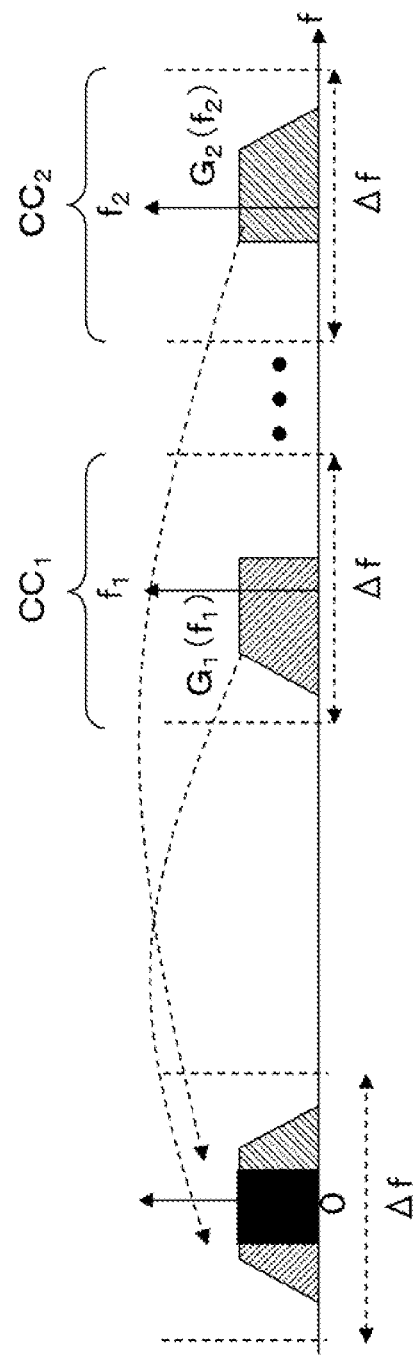
FIG. 3 is a view illustrating an example in which a signal transmitted by the carrier aggregation is reproduced collectively on the reception side.
Figure 4:
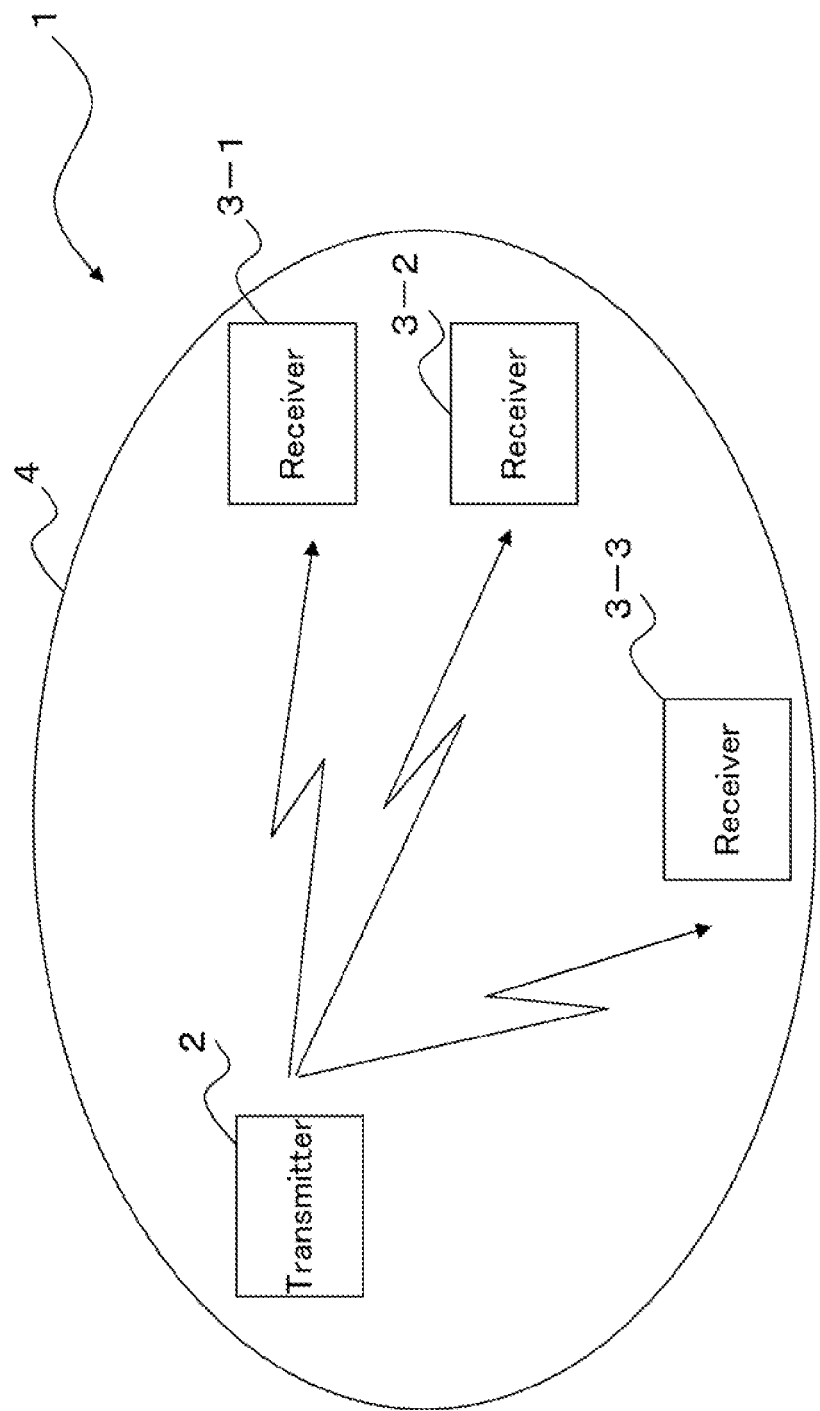
FIG. 4 is a view illustrating an example of a wireless communication system according to an embodiment.

FIG. 4 is a view illustrating an example of a configuration of a wireless communication system according to an embodiment.

A wireless communication system 1 illustrated in FIG. 4 illustratively includes a transmitter 2 and receivers 3-1 to 3-3. It is to be noted that, where the receivers 3-1 to 3-3 are not distinguished from one another, each receiver is hereinafter referred to simply as receiver 3. Further, the number of such transmitters 2 and receivers 3 is not limited to that illustrated in FIG. 4.

Here, the transmitter 2 is a wireless communication apparatus capable of carrying out wireless communication through carrier aggregation. For example, a wireless base station, a wireless terminal, a repeating apparatus in LTE-A or the like can function as the transmitter 2.

The transmitter 2 divides a signal (data) destined for the receiver 3 into a plurality of signals and allocates the signals obtained by the division (hereinafter referred to sometimes as divided signals) to a plurality of component carriers to produce a wireless signal. Then, the transmitter 2 transmits the produced wireless signal to the receiver 3.

Further, the transmitter 2 can directly wirelessly communicate with the receivers 3-1 to 3-3 positioned within a wireless area 4 such as a cell, a sector or the like provided by the transmitter 2. It is to be noted that the transmitter 2 may indirectly wirelessly communicate with a different receiver positioned outside the wireless area 4 through various repeating apparatus.

On the other hand, the receiver 3 receives the wireless signal from the transmitter 2 and performs a predetermined reception process for the received wireless signal and then performs an analog/digital (A/D) conversion process with a predetermined sampling frequency (hereinafter referred to sometime as reception sampling frequency).

Consequently, the divided signals allocated to the component carriers by the transmitter 2 are down converted into the base band and are synthesized with each other to reproduce (restore) the original signal.

In particular, by a reception sampling process by the receiver 3, the component carriers are superimposed with each other on the frequency axis. It is to be noted that a wireless terminal, a wireless base station, a repeating apparatus in LTE-A or the like can function as the receiver 3.

In the present embodiment, the component carriers are arranged at such positions that the signals allocated to the component carriers do not overlap with each other when the component carriers are superimposed with each other on the frequency axis upon the reception process.

In particular, for example, the transmitter 2 controls center frequencies of the component carriers based on the reception sampling frequency in the receiver 3 or the receiver 3 controls a down convert frequency when the wireless signal is to be down converted. Further, the receiver 3 may control the sampling frequency in the A/D conversion process.

The receiver 3 which receives the signals allocated to the component carriers arranged as described above can collectively carry out a reception process with the predetermined reception sampling frequency for the component carriers to reproduce the signal correctly. This is because the data allocated to the component carriers do not overlap with each other on the frequency axis.

Further, since the receiver 3 can collectively reproduce the data using a single sampling frequency, the provision number of local oscillators in the receiver 3 can be decreased and the configuration of the receiver 3 can be simplified, and reduction of the cost can be implemented.

An example of a configuration of the transmitter 2 and the receiver 3 is described below. It is to be noted that the configurations of the transmitter 2 and the receiver 3 are an example to the end and the present invention is not limited to such configurations as hereinafter described.

(1.2) Example of Configuration of Transmitter 2

Figure 5:
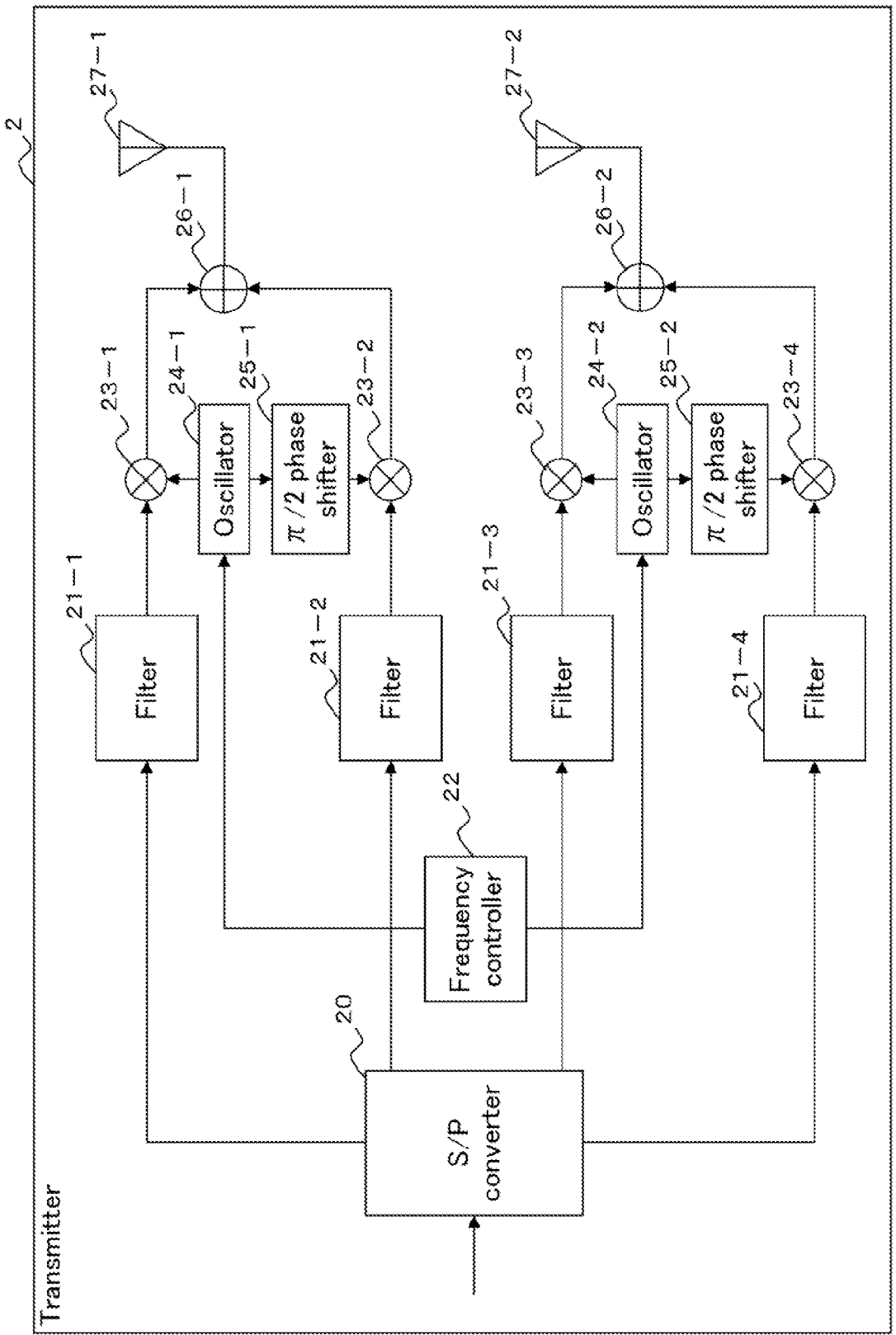
FIG. 5 is a view illustrating an example of a transmitter illustrated in FIG. 4.

FIG. 5 is a view illustrating an example of a configuration of the transmitter 2.

The transmitter 2 illustrated in FIG. 5 illustratively includes a S/P (serial/parallel) converter 20, filters 21-1 to 21-4, a frequency controller 22, multipliers 23-1 to 23-4 and oscillators 24-1 and 24-2. Further, the transmitter 2 illustratively includes $\pi/2$ phase shifters 25-1 and 25-2, adders 26-1 and 26-2 and antennas 27-1 and 27-2.

It is to be noted that the configuration illustrated in FIG. 5 is a mere example of the configuration of the transmitter 2 where the transmitter 2 divides a signal destined for the receiver 3 into two signals and allocates the divided signals to two component carriers to transmit the signals. For example, where the transmitter 2 divides a signal destined for the receiver 3 into M (M indicates an integer of two or more) signals and allocates the M divided signals to M component carriers and then transmits the resulting signals, it is a matter of course that a number of filters, multipliers, oscillators, $\pi/2$ phase shifters, adders and antennas corresponding to the number of (M) component carriers are provided in the transmitter 2. Further, an LPF (Low Pass Filter) may be applied as the filters described above.

Here, the S/P converter 20 performs a serial/parallel conversion process for the signal destined for the receiver 3. In the example illustrated in FIG. 5, the S/P converter 20 performs the serial/parallel conversion process for the signal destined for the receiver 3 into two divided signals. One of the divided signals by the S/P converter 20 is outputted to the filters 21-1 and 21-2 and the other one of the divided signals by the S/P converter 20 is outputted to the filters 21-3 and 21-4.

The filters 21-1 to 21-4 allow a signal having a predetermined frequency band to pass therethrough but blocks a signal having a frequency band other than the predetermined frequency band.

The oscillators 24-1 and 24-2 individually generate an alternating wave having a frequency controlled by the frequency controller 22 hereinafter described.

Further, the π/2 phase shifters 25-1 and 25-2 individually apply a π/2 phase shift to the alternating waves from the oscillators 24-1 and 24-2, respectively.

Further, the multiplier 23-1 multiplies the signal from the filter 21-1 and an alternating wave from the oscillator 24-1 by each other and outputs a result of the multiplication, and the multiplier 23-2 multiplies the signal from the filter 21-2 and a π/2 phase-shifted alternating wave from the π/2 phase shifter 25-1 by each other and outputs a result of the multiplication.

Similarly, the multiplier 23-3 multiplies the signal from the filter 21-3 and an alternating wave from the oscillator 24-2 by each other and outputs a result of the multiplication, and the multiplier 23-4 multiplies the signal from the filter 21-4 and a π/2 phase-shifted alternating wave from the π/2 phase shifter 25-2 by each other and outputs a result of the multiplication.

Consequently, the divided signals by the S/P converter 20 are up converted into the signals in the center frequency bands which the component carriers individually have.

Then, the adder 26-1 adds the signal outputted from the multiplier 23-1 and the signal outputted from the multiplier 23-2 to each other and outputs a result of the addition to the antenna 27-1. Further, the adder 26-2 adds the signal outputted from the multiplier 23-3 and the signal outputted from the multiplier 23-4 to each other and outputs a result of the addition to the antenna 27-2.

Further, the antennas (transmission sections) 27-1 and 27-2 wirelessly transmit the signals from the adders 26-1 and 26-2, respectively, to the receiver 3.

As recognized from the configuration described above, the transmitter 2 illustrated in FIG. 5 can perform phase modulation, for example, for the signal destined for the receiver 3 and can wirelessly transmit a result of the phase modulation.

In this instance, a first I signal ($I_1$ signal) to be allocated to one of the component carriers is outputted from the filter 21-1 and a first Q signal ($Q_1$ signal) to be allocated to the one of the component carriers is outputted from the filter 21-2.

Further, a second I signal ($I_2$ signal) to be allocated to the other one of the component carriers is outputted from the filter 21-3 and a second Q signal ($Q_2$ signal) to be allocated to the other one of the component carriers is outputted from the filter 21-4.

Next, the frequency controller 22 in the present embodiment is described.

The frequency controller (transmitter side controller) 22 controls the center frequencies of the component carriers based on the reception sampling frequency used for the A/D conversion process in the receiver 3.

In particular, for example, the frequency controller 22 arranges the component carriers at such positions that the data allocated to the component carriers do not overlap with each other when the component carriers are superimposed with each other on the frequency axis.

In particular, the frequency controller 22 in the present embodiment controls the center frequencies of the component carriers based on the reception sampling frequency such that, regarding the component carriers, the following expressions are satisfied:

for $F_i$ and $F_j$ which satisfy $\text{Mod}(F_i,\Delta f)=\text{Mod}(F_j,\Delta f)$,
when $G_k(F_i)\neq 0$;

$G_m(F_j)=0$, $G_k(F_j)=0$ and $G_m(F_i)=0$    [Expression 1]

where k, m, i and j are integers which satisfy $k \neq m$ and $i \neq j$, $F_i$ is an ith frequency, $F_j$ is a jth frequency, $\Delta f$ is a reception sampling frequency, and G(F) is a spectrum at the frequency F.

Figure 6:
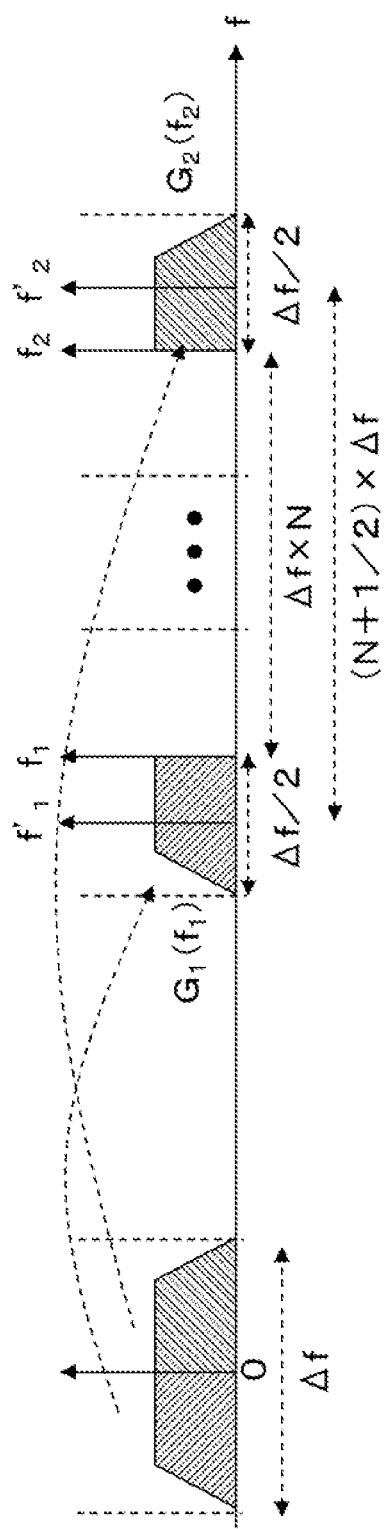
FIG. 6 is a view illustrating an example of arrangement of component carriers according to the embodiment.

Here, an example of arrangement of the component carriers is illustrated in FIG. 6.

As recognized from FIG. 6, for example, the transmitter 2 divides the signal destined for the receiver 3 having a bandwidth $\Delta f$ into a plurality of signals and allocates the divided signals to the component carriers having the center frequencies $f_1$ and $f_2$ ($0<f_1<f_2$) to produce a wireless signal.

Here, reference characters $G_1(f_1)$ and $G_2(f_2)$ individually represent a spectrum of the divided signals, and, in the example illustrated in FIG. 6, the spectrums individually have a bandwidth of $\Delta f/2$. Further, reference characters $f_1'$ and $f_2'$ ($0<f_1'<f_2'$) individually represent a center frequency of the band occupied by the divided signals.

In the example illustrated in FIG. 6, the distance between the center frequencies $f_1$ and $f_2$ of the component carriers is N (N indicates a natural number) times of the reception sampling frequency $\Delta f$. For example, the transmitter 2 may control the center frequencies $f_1$ and $f_2$ of the component carriers to multiples of the reception sampling frequency $\Delta f$ to implement such arrangement of the component carriers as illustrated in FIG. 6.

Further, the distance between the center frequencies $f_1'$ and $f_2'$ of the bands occupied by the signals is $(N+\frac{1}{2})$ times of the reception sampling frequency $\Delta f$. Here, since the frequencies of the actual wireless signals transmitted from the antennas 27-1 and 27-2 are the center frequencies $f_1'$ and $f_2'$, the frequency controller 22 may control the center frequencies $f_1'$ and $f_2'$ of the bands occupied by the signals in place of control of the center frequencies $f_1$ and $f_2$ of the component carriers. For example, where the frequency $f_1'$ is applied to the oscillator 24-1, the frequency controller 22 can control so that the frequency $f_2'=f_1'+(N+\frac{1}{2})\times\Delta f$ is applied to the oscillator 24-2.

Further, normally the reception sampling frequency is set to a multiple of a sub carrier distance, a symbol rate, a chip rate or the like. Therefore, the transmitter 2 may control the center frequencies $f_1$ and $f_2$ of the component carriers by assuming that a multiple of a known value of, for example, a sub carrier distance, a symbol rate, a chip rate or the like is the reception sampling frequency $\Delta f$.

Further, the transmitter 2 may feed back information regarding the reception sampling frequency $\Delta f$ regularly or irregularly upon communication starting from the receiver 3. By the configuration, even if the reception sampling frequency $\Delta f$ is unknown to the transmitter 2 side, the center frequencies $f_1$ and $f_2$ of the component carriers can be controlled as illustrated in FIG. 6.

(1.3) Example of Configuration of Receiver 3

Figure 7:
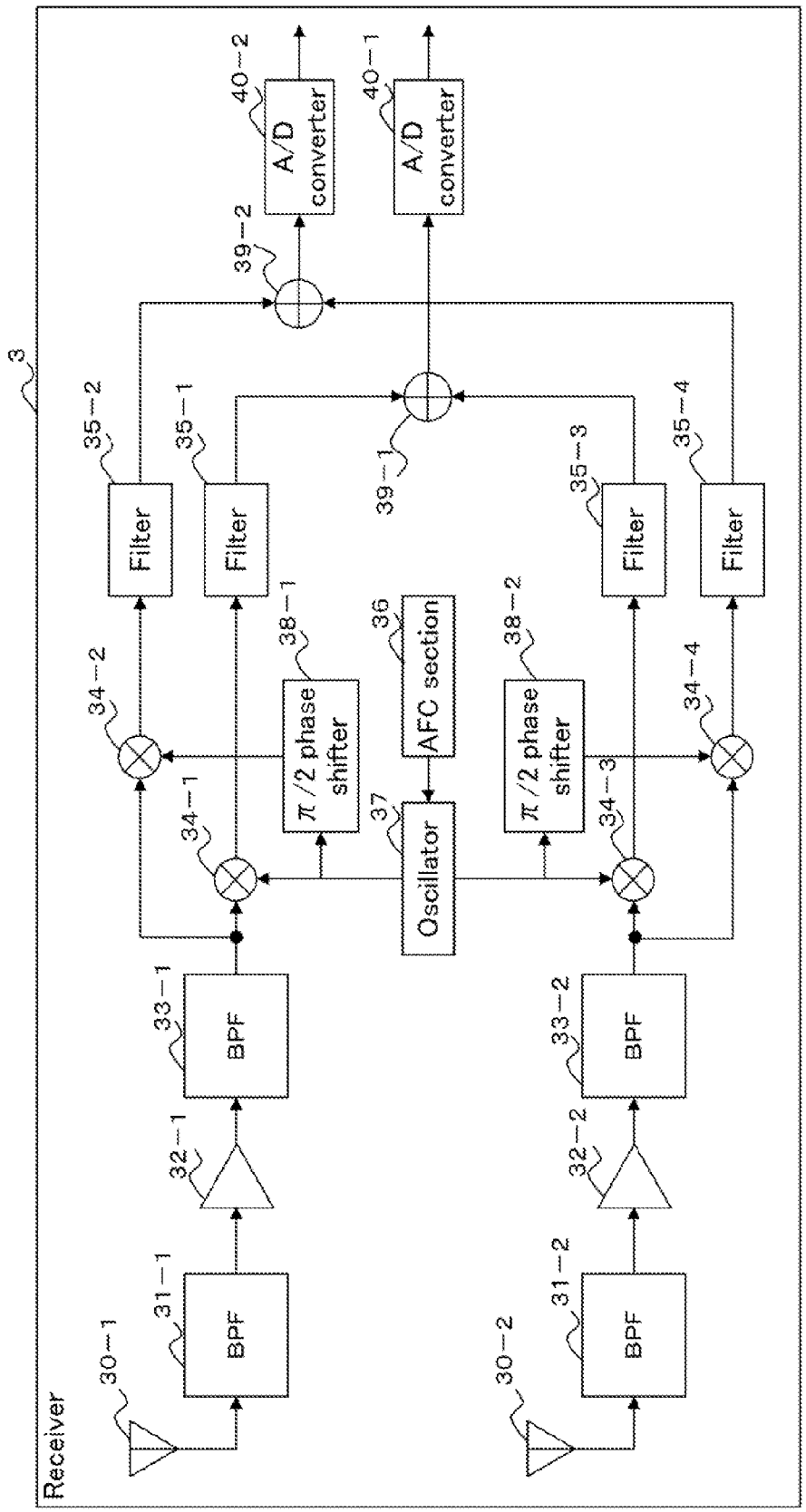
FIG. 7 is a view illustrating an example of a receiver illustrated in FIG. 4.

FIG. 7 is a view illustrating an example of a configuration of the receiver 3.

The receiver 3 illustrated in FIG. 7 illustratively includes antennas 30-1 and 30-2, BPFs (band pass filters) 31-1 and 31-2, LNAs (low noise amplifiers) 32-1 and 32-2, BPFs 33-1 and 33-2 and multipliers 34-1 to 34-4. Further, the receiver 3 illustratively includes filters 35-1 to 35-4, an AFC (Automatic Frequency Control) section 36, an oscillator 37, π/2 phase shifters 38-1 and 38-2, adders 39-1 and 39-2 and A/D converters 40-1 and 40-2.

It is to be noted that FIG. 7 is a mere example illustrating a configuration of the receiver 3 where two signals allocated to two component carriers are received and processed. For example, where the receiver 3 receives and processes M signals allocated to M component carriers, it is a matter of course that a number of antennas, LNAs, BPFs, multipliers, π/2 phase shifters, filters and adders corresponding to the number of the (M) component carriers are provided in the receiver 3. Further, each of the filters described above may be configured from an LPF (Low Pass Filter).

The antennas 30-1 and 30-2 receive the wireless signal from the transmitter 2. For example, the antenna 30-1 can receive the wireless signal of the frequency $f_1'$ and the antenna 30-2 can receive the wireless signal of the frequency $f_2'$. It is to be noted that, where the receiver 3 issues a feedback notification of the reception sampling frequency to the transmitter 2, the antennas 30-1 and 30-2 may function as transmission antennas.

The BPFs 31-1 and 31-2 allow signals having predetermined bands to pass therethrough but block signals having bands different from the predetermined bands.

The LNAs 32-1 and 32-2 amplify the signals passing through the BPFs 31-1 and 31-2. It is to be noted that preferably a configuration that the LNAs 32-1 and 32-2 do not amplify signals having bands other than the passing bands of the BPFs 31-1 and 31-2 as far as possible is applied in order to suppress noise.

The BPFs 33-1 and 33-2 allow, regarding the signals outputted from the LNAs 32-1 and 32-2, the signals having the predetermined bands to pass therethrough but block signals having bands different from the predetermined bands, respectively.

The oscillator 37 generates an alternating wave having a frequency controlled by the AFC section 36.

Figure 8:
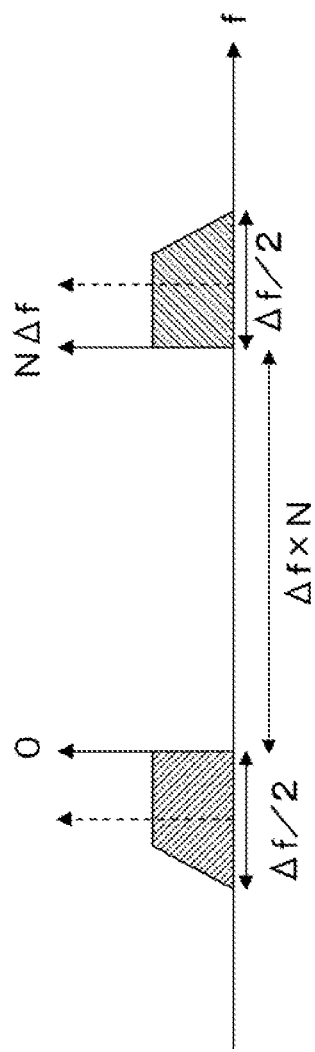
FIG. 8 is a view illustrating an example of spectrum arrangement after down converting.

The AFC section 36 controls the frequency of the oscillator 37. In the present embodiment, for example, the AFC section 36 can control so that the oscillator 37 generates an alternating wave having the frequency f1. The alternating wave outputted from the oscillator 37 is inputted individually to the multipliers 34-1 and 34-3 and the π/2 phase shifters 38-1 and 38-2. In particular, the wireless signals received by the antennas 30-1 and 30-2 are frequency converted (down converted) in accordance with the frequency of the oscillator 37.

Where the component carriers having the center frequencies $f_1$ and $f_2$ are down converted in accordance with the frequency $f_1$, the spectrum after the down converting is arranged, for example, as illustrated in FIG. 8.

The π/2 phase shifters 38-1 and 38-2 apply a π/2 phase shift to the alternating wave from the oscillator 37.

The multiplier 34-1 multiplies the signal from the BPF 33-1 and the alternating wave from the oscillator 37 by each other and outputs a result of the multiplication, and the multiplier 34-2 multiplies the signal from the BPF 33-1 and the π/2 phase shift alternating wave from the π/2 phase shifter 38-1 by each other and outputs a result of the multiplication.

Similarly, the multiplier 34-3 multiplies the signal from the BPF 33-2 and the alternating wave from the oscillator 37 by each other and outputs a result of the multiplication, and the multiplier 34-4 multiplies the signal from the BPF 33-2 and the π/2 phase shift alternating wave from the π/2 phase shifter 38-2 by each other and outputs a result of the multiplication.

As recognized from the configuration described above, the receiver 3 illustrated in FIG. 7 can down convert the wireless signal transmitted from the transmitter 2 with the frequency of the oscillator 37 to extract IQ signals. In this instance, a first I signal ($I_1$ signal) allocated to one of the component carriers is outputted from the multiplier 34-1, and a first Q signal ($Q_1$ signal) allocated to the one of the component carriers is outputted from the multiplier 34-2. Further, a second I signal ($I_2$ signal) allocated to the other one of the component carriers is outputted from the multiplier 34-3, and a second Q signal ($Q_2$ signal) allocated to the other one of the component carriers is outputted from the multiplier 34-4.

The filters 35-1 to 35-4 allow signals having predetermined frequency bands to pass therethrough but block signals having frequency bands different from the predetermined frequency bands.

Then, the adder 39-1 adds the signal outputted from the filter 35-1 and the signal outputted from the filter 35-3 to each other and outputs the resulting signal to the A/D converter 40-1, and the adder 39-2 adds the signal outputted from the filter 35-2 and the signal outputted from the filter 35-4 to each other and outputs the resulting signal to the A/D converter 40-2.

The A/D converters (reception processing sections) 40-1 and 40-2 convert the analog signals outputted from the adders 39-1 and 39-2 into digital signals, respectively. At this time, both of the reception sampling frequencies in the reception sampling process carried out by the A/D converters 40-1 and 40-2 are Δf.

As described above, with the present embodiment, the receiver 3 can extract (reproduce) signals in various bands using a single local oscillator without mixture of the signals.

[2] First Modification

While the example in which the center frequencies of the component carriers are controlled is described in the embodiment described above, such spectrum arrangement as illustrated in FIG. 8 may be implemented by controlling the down convert frequency when the wireless signal is down converted as in the present modification. It is to be noted that, in this instance, the transmitter 2 may set the center frequencies of the component carriers to arbitrary frequencies and issue a notification of information regarding the set frequencies to the receiver 3.

Figure 9:
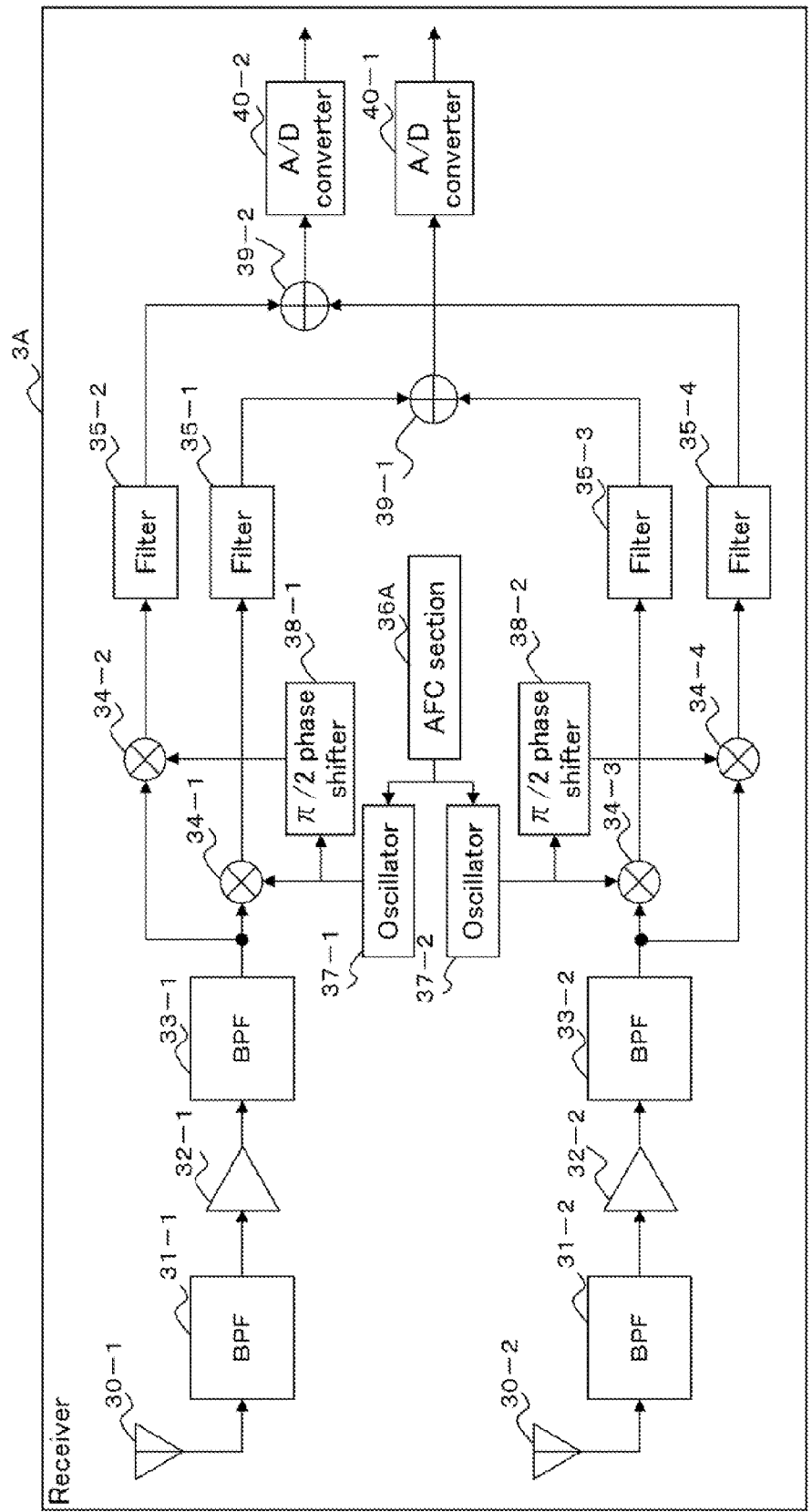
FIG. 9 is a view illustrating an example of a receiver according to a first modification.

FIG. 9 is a view illustrating an example of a configuration of a receiver 3A in the present modification.

The receiver 3A illustrated in FIG. 9 illustratively includes antennas 30-1 and 30-2, BPFs 31-1 and 31-2, LNAs 32-1 and 32-2, BPFs 33-1 and 33-2 and multipliers 34-1 to 34-4. Further, the receiver 3A illustratively includes filters 35-1 to 35-4, an AFC section 36A, oscillators 37-1 and 37-2, π/2 phase shifters 38-1 and 38-2, adders 39-1 and 39-2 and A/D converter 40-1 and 40-2. It is to be noted that each of the filters may be configured from a LPF (Low Pass Filter). Further, in FIG. 9, since like elements to those in FIG. 7 are denoted by like reference characters, description of the like elements is omitted.

The oscillators 37-1 and 37-2 individually generate an alternating wave having a frequency controlled by the AFC section 36A.

The AFC section (receiver side controller) 36A in the present modification controls a down convert frequency when the wireless signal is down converted, that is, frequencies of the oscillators 37-1 and 37-2, such that data do not overlap with each other when the component carriers are superimposed with each other on the frequency axis.

For example, where the wireless signals having the frequencies $f_1'$ and $f_2'$ are received from the transmitter 2, the AFC section 36A controls the oscillation frequency of the oscillator 37-1 to $(f_1'+\Delta f/4)$ and controls the oscillation frequency of the oscillator 37-2 to $(f_2'+(N-¼)\Delta f)$.

It is to be noted that the oscillation frequencies just described are a mere example, and the AFC section 36A may control the frequencies of the oscillators 37-1 and 37-2 such that, regarding the component carriers, the following expressions are satisfied:

for $F_i$ and $F_j$ which satisfy $\text{Mod}(F_i,\Delta f)=\text{Mod}(F_j,\Delta f)$, when $G_k(F_i) \neq 0$;

$G_m(F_j)=0$, $G_k(F_j)=0$ and $G_m(F_i)=0$      [Expression 2]

where k, m, i and j are integers which satisfy $k \neq m$ and $i \neq j$, $F_i$ is an ith frequency, $F_j$ is a jth frequency, $\Delta f$ is a reception sampling frequency, and G(F) is a spectrum at the frequency F.

Consequently, also in the present modification, the spectrum after the down converting in the receiver 3A is arranged as illustrated in FIG. 8. As illustrated in FIG. 8, the center frequency distances of the component carriers after the down converting are individually N times of $\Delta f$. Further, the center frequencies of the component carriers after the down converting are individually a multiple of $\Delta f$.

As described above, also in the present modification, the receiver 3A can extract (reproduce) signals of various bands without mixture of the signals.

It is to be noted that, while the AFC section 36A in the present modification controls the two oscillators 37-1 and 37-2, a pair of AFC sections may be provided in an associated relationship with the oscillators 37-1 and 37-2. In this instance, one of the AFC sections can control the oscillator 37-1 and the other one of the AFC sections can control the oscillator 37-2, and the paired AFC sections may be operated in a cooperating relationship with each other.

[3] Second Modification

Further, sampling frequencies (reception sampling frequencies) of the A/D converters 40-1 and 40-2 may be controlled to adjust data such that they do not overlap with each other when the component carriers are superimposed with each other on the frequency axis as in the present modification.

Figure 10:
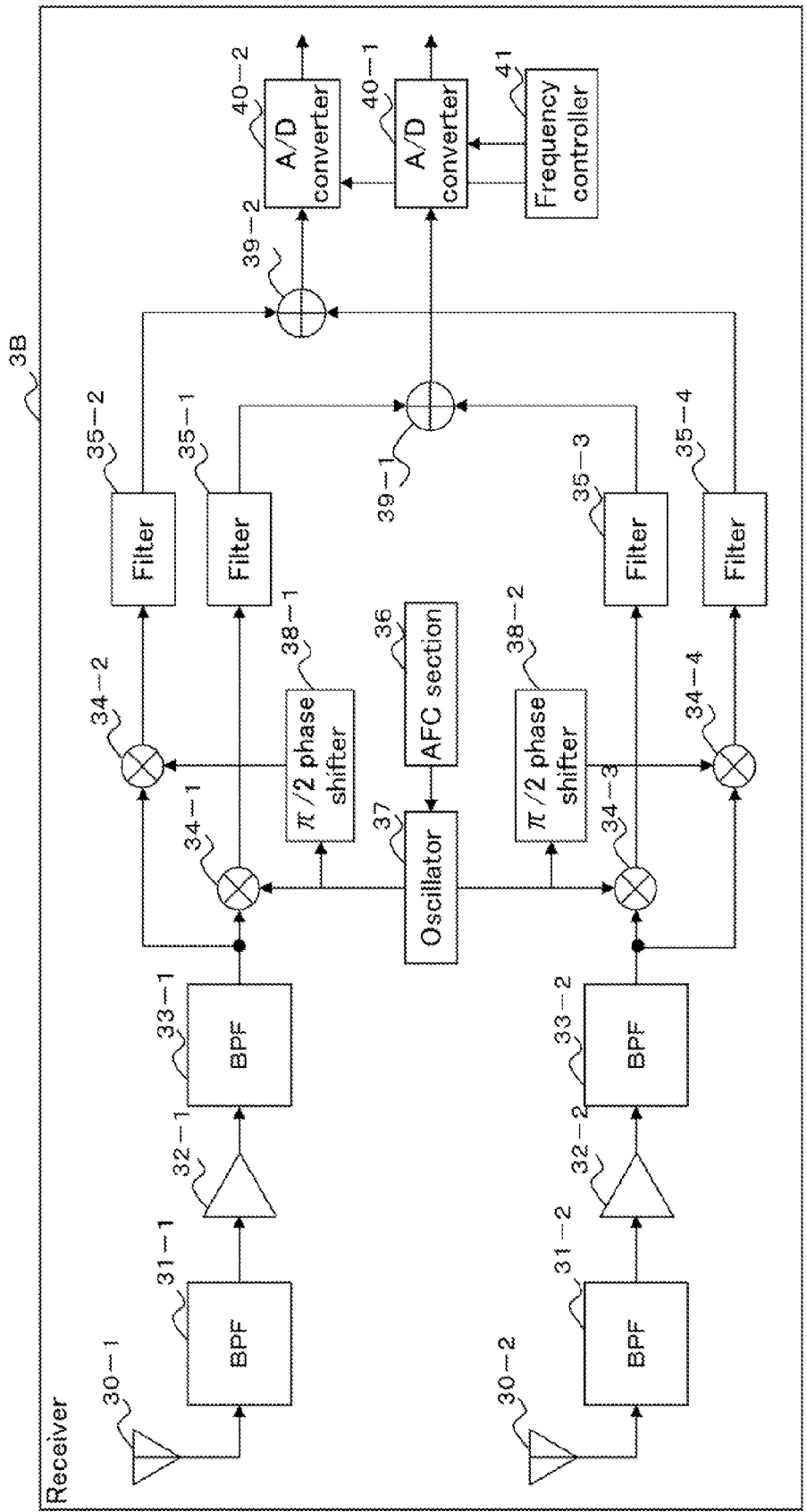
FIG. 10 is a view illustrating an example of a receiver according to a second modification.

FIG. 10 is a view illustrating an example of a configuration of a receiver 3B in the present modification.

The receiver 3B illustrated in FIG. 10 illustratively includes antennas 30-1 and 30-2, BPFs 31-1 and 31-2, LNAs 32-1 and 32-2, BPFs 33-1 and 33-2 and multipliers 34-1 to 34-4. Further, the receiver 3B illustratively includes filters 35-1 to 35-4, an AFC section 36, oscillators 37-1 and 37-2, n/2 phase shifters 38-1 and 38-2, adders 39-1 and 39-2, A/D converters 40-1 and 40-2 and a frequency controller 41. It is to be noted that each of the filters described above may be configured from a LPF (Low Pass Filter). Further, since like elements to those in FIG. 7 are denoted by like reference characters in FIG. 10, description of the like elements is omitted.

The frequency controller 41 controls the sampling frequency $\Delta f$ of the A/D converters 40-1 and 40-2. In particular, for example, the frequency controller 41 controls the frequency $\Delta f$ to a value equal to the quotient obtained by dividing a difference $(f_2-f_1)$ between the center frequencies of the component carriers by N. Therefore, a notification of information regarding the center frequencies $f_1$ and $f_2$ may be issued in advance to the transmitter 2.

Consequently, also in the present modification, the receiver 3B can extract (reproduce) signals in the various bands without mixture of the signals.

[4] Third Modification

Here, taking notice of positions of data allocated to the component carriers, in the present modification, the data are arranged such that the data do not overlap with each other when the component carriers are superimposed with each other on the frequency axis so that the receiver 3 can reproduce the signal correctly.

As an example of such data arrangement as described above, in the embodiment and modifications described above, the data are arranged such that the data do not overlap with each other and a gap does not appear between the data when the component carriers are superimposed with each other on the frequency axis.

However, the data may be arranged such that the data do not overlap with each other and a gap appears between the data when the component carriers are superimposed with each other on the frequency axis as in the present modification.

For example, noise is sometimes superposed on the wireless signal. In such a case as just described, the receiver 3 can use a noise filter to cut noise to some degree.

Figure 11:
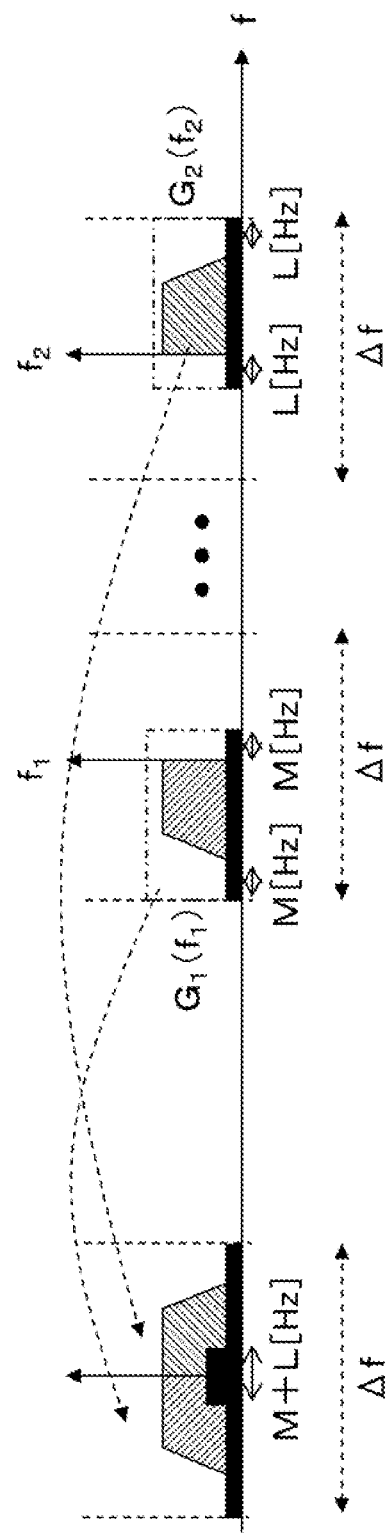
FIG. 11 is a view illustrating an example of arrangement of the component carriers where a signal cannot be reproduced because of noise.

A relationship between an example of data arrangement of the component carriers and noise is illustrated in FIG. 11.

As illustrated in FIG. 11, in a noise filter (refer to an alternate long and short dash line in FIG. 11) provided in the receiver 3, predetermined margins (for example, M [Hz], L [Hz]) are arranged on both sides of each data regarding the data allocated to the component carriers to cut noise.

However, since, if the component carriers of data arranged as illustrated in FIG. 11 are down converted and synthesized by the receiver 3, then a noise component of (M+L) [Hz] remains around the center of the base band, an influence is imposed on the signal quality.

Figure 12:
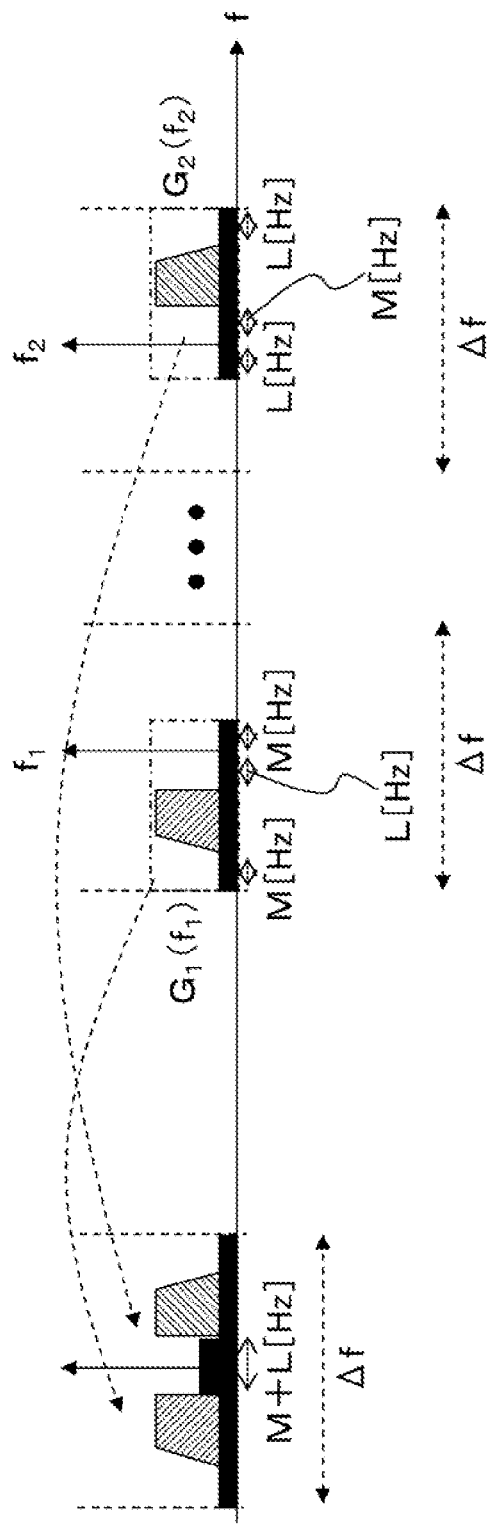
FIG. 12 is a view illustrating an example of arrangement of component carriers according to a third modification.

Therefore, in the present modification, as illustrated in FIG. 12, the data can be allocated by the transmitter 2 to the component carriers taking the margin of the noise filter provided in the receiver 3 into consideration so that the influence of the noise on the signal is suppressed.

In particular, in the present modification, the data are allocated to the component carriers at such positions that the noise superposed on the wireless signal does not overlap with the data when the component carriers are superimposed with each other on the frequency axis.

It is to be noted that the present modification is only different from the embodiment and modifications described above in the arrangement of the data and can be carried out for any configuration of the embodiment and modifications described above.

Consequently, even if noise is superposed in the wireless signal, effects similar to those in the embodiment and modifications described above can be obtained.

[5] Fourth Modification

Figure 13:
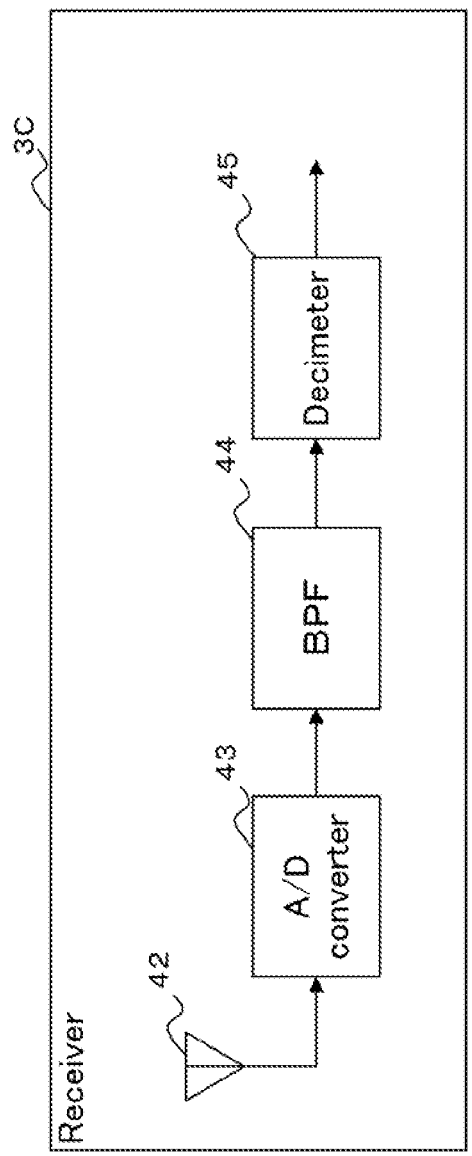
FIG. 13 is a view illustrating an example of a receiver according to a fourth modification.

Further, a receiver 3C illustrated in FIG. 13 may be used in place of the receivers 3, 3A and 3B.

The receiver 3C illustrated in FIG. 13 illustratively includes an antenna 42, an A/D converter 43, a BPF 44 and a decimeter 45.

The antenna 42 receives the wireless signal from the transmitter 2. For example, the antenna 42 can receive the wireless signal of the frequency $f_1'$ and can receive the wireless signal of the frequency $f_2'$. It is to be noted that, where the receiver 3C issues a feedback notification of information regarding the reception sampling frequency and the decimeter 45 to the transmitter 2, the antenna 42 may function as a transmission antenna.

The A/D converter 43 performs an analog/digital conversion process for the signal received through the antenna 42. Here, the A/D converter 43 in the present modification is configured, for example, from a wide-band A/D converter having a bandwidth of several GHz. Consequently, the A/D converter 43 can perform a sampling process collectively for the component carriers transmitted from the transmitter 2.

The BPF 44 allows a signal having a predetermined band to pass therethrough but blocks a signal having any band different from the predetermined band. Consequently, the BPF 44 can suppress noise superposed on the wireless signal.

The decimeter 45 performs a thinning out process for the signal from the BPF 44. The thinning out process is a process, where decimation is observed on a time axis, any signal point is extracted from among every several ones of discrete signal points.

Figure 14:
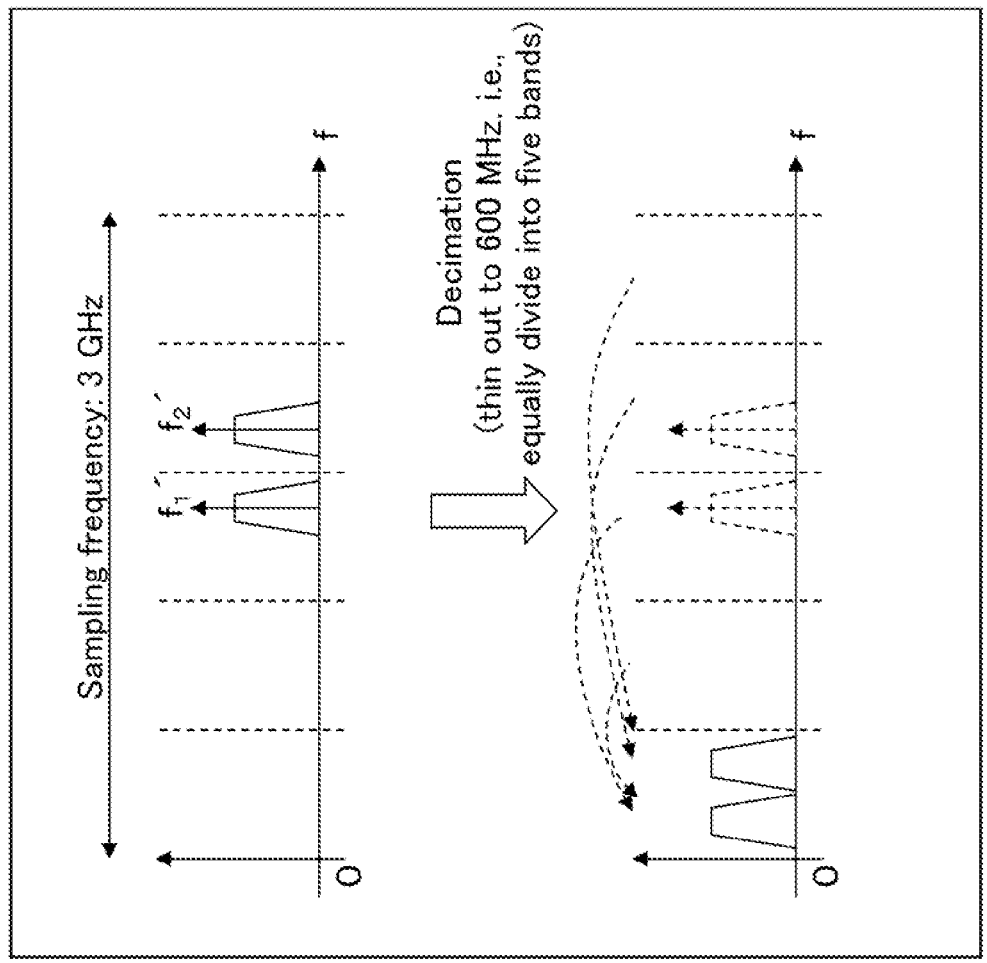
FIG. 14 is a view illustrating an example of data arrangement before and after decimation.

For example, where the sampling frequency of the A/D converter 43 is 3G [Hz] and the decimeter 45 performs a thinning out process for the sampling frequency to ⅕ as illustrated in FIG. 14, different 600M [Hz] in the 3G [Hz] are superimposed with each other.

In this case, the transmitter 2 controls the center frequencies of the component carriers based on the information regarding the reception sampling frequency and the decimeter 45.

Consequently, where the signal is thinned out by the decimeter 45, the component carriers can be arranged at such positions that the data allocated to the component carriers on the frequency axis do not overlap with each other.

Consequently, effects similar to those in the embodiment and modifications described above can be obtained.

[6] Others

The configurations, measures and functions of the wireless communication system 1, transmitter 2, receiver 3 and repeating apparatus 4 described above may be selected and chosen when necessary or may be suitably combined. In particular, the configurations and functions described above may be selected and chosen or used in a suitable combination so that the function of the present invention described above can be demonstrated.

Further, even if the number of the component carriers is 3 or more as illustrated in FIG. 15, the frequency controller 22 of the transmitter 2 controls the center frequencies of the component carriers based on the reception sampling frequency such that, regarding the component carriers, the following expressions are satisfied:

$$\text{for } F_i \text{ and } F_j \text{ which satisfy Mod}(F_i, \Delta f) = \text{Mod}(F_j, \Delta f),$$
$$\text{when } G_k(F_i) \neq 0;$$

$$G_m(F_j) = 0, G_k(F_j) = 0 \text{ and } G_m(F_i) = 0 \quad \text{[Expression 3]}$$

where k, m, i and j are integers which satisfy k≠m and i≠j, $F_i$ is an ith frequency, $F_j$ is a jth frequency, $\Delta f$ is a reception sampling frequency, and G(F) is a spectrum at the frequency F. Consequently, effects similar to those in the embodiment and modifications described above can be obtained.

Or, the AFC section 36A of the receiver 3A controls the frequencies of the oscillators 37-1 and 37-2 such that the following expressions are satisfied:

$$\text{for } F_i \text{ and } F_j \text{ which satisfy Mod}(F_i, \Delta f) = \text{Mod}(F_j, \Delta f),$$
$$\text{when } G_k(F_i) \neq 0;$$

$$G_m(F_j) = 0, G_k(F_j) = 0 \text{ and } G_m(F_i) = 0 \quad \text{[Expression 4]}$$

where k, m, i and j are integers which satisfy k≠m and i≠j, $F_i$ is an ith frequency, $F_j$ is a jth frequency, $\Delta f$ is a reception sampling frequency, and G(F) is a spectrum at the frequency F. Consequently, effects similar to those in the embodiment and modifications described above can be obtained.

Or, the frequency controller 41 of the receiver 3B controls the reception sampling frequency $\Delta f$ to a value equal to the quotient obtained by dividing a difference ($f_2 - f_1$) between the center frequencies of the component carriers by N. Consequently, effects similar to those in the embodiment and modifications described above can be obtained.

All examples and conditional language recited herein are intended for pedagogical purposes to aid the reader in understanding the invention and concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:

1. A wireless communication system, comprising:
a transmitter that transmits a wireless signal produced by allocating data to component carriers for a plurality of communication bands; and
a receiver that receives the wireless signal and carries out an analog/digital conversion process as a reception sampling process for the received wireless signal with a predetermined reception sampling frequency wherein
the component carriers are arranged at such positions that the data do not overlap with each other when the component carriers are superimposed on a frequency axis by the reception sampling process carried out by the receiver, and
each interval of center frequencies of the component carriers is an (N+½) multiple of the reception sampling frequency, wherein N is a positive integer.

2. The wireless communication system according to claim 1, wherein the transmitter includes a transmitter side controller that controls each center frequency of the component carriers based on the reception sampling frequency.

3. The wireless communication system according to claim 1, wherein each center frequency of the component carriers is a multiple of the reception sampling frequency.

4. The wireless communication system according to claim 1, wherein the receiver includes a receiver side controller that controls a down convert frequency when the wireless signal is to be down converted such that the data do not overlap with each other when the component carriers are superimposed on the frequency axis.

5. The wireless communication system according to claim 4, wherein each interval of the center frequencies of the component carriers after the down converting is an integral multiple of the reception sampling frequency.

6. The wireless communication system according to claim 4, wherein each center frequency of the component carriers after the down converting is a multiple of the reception sampling frequency.

7. The wireless communication system according to claim 1, wherein the data are allocated to the component carriers at such positions that noise superposed on the wireless signal do not overlap with each other when the component carriers are superimposed on the frequency axis.

8. The wireless communication system according to claim 1, wherein the receiver includes a decimeter that carries out a thinning out process for the sampling frequency; and
the component carriers are arranged at such positions that the data allocated to the component carriers do not overlap with each other on the frequency axis after the thinning out process by the decimeter.

9. A transmitter of a wireless communication system which includes the transmitter and a receiver, the transmitter transmitting a wireless signal produced by allocating data to component carriers for a plurality of communication bands, the receiver receiving the wireless signal and carrying out an analog/digital conversion process as a reception sampling process for the received wireless signal with a predetermined reception sampling frequency, the transmitter comprising:
a controlling section that controls center frequencies of the component carriers based on the reception sampling frequency in such a manner that the data do not overlap with each other when the component carriers are superimposed on a frequency axis by the reception sampling process carried out by the receiver; and
a transmission section that transmits a wireless signal produced by allocating data to the component carriers having the center frequencies controlled by the controlling section, wherein
each interval of center frequencies of the component carriers is an $(N+\frac{1}{2})$ multiple of the reception sampling frequency, wherein N is a positive integer.

10. A receiver of a wireless communication system which includes a transmitter and the receiver, the transmitter transmitting a wireless signal produced by allocating data to component carriers for a plurality of communication bands, the receiver receiving the wireless signal, the receiver comprising:
a reception processing section that carries out a reception process for the received wireless signal with a predetermined reception sampling frequency; and
a controlling section that controls a down convert frequency when the wireless signal is to be down converted such that the data do not overlap with each other when the component carriers are superimposed on a frequency axis, wherein
each interval of center frequencies of the component carriers is an $(N+\frac{1}{2})$ multiple of the reception sampling frequency, wherein N is a positive integer.

11. A wireless communication method for use with a wireless communication system which includes a transmitter that transmits a wireless signal produced by allocating data to component carriers for a plurality of communication bands and a receiver that receives the wireless signal, the wireless communication method comprising:
carrying out an analog/digital conversion process as a reception sampling process for the received wireless signal with a predetermined reception sampling frequency;
arranging the component carriers at such positions that the data do not overlap with each other when the component carriers are superimposed on a frequency axis by the reception sampling process carried out by the receiver; and
carrying out communication using the component carriers arranged at the positions, wherein
each interval of center frequencies of the component carriers is an $(N+\frac{1}{2})$ multiple of the reception sampling frequency, wherein N is a positive integer.

12. A wireless communication system, comprising:
a transmitter that transmits a wireless signal produced by allocating data to component carriers for a plurality of communication bands; and
a receiver that receives the wireless signal and carries out a reception process for the received wireless signal with a predetermined reception sampling frequency; and wherein
the component carriers are arranged such that, regarding the plural component carriers, the following expressions are satisfied:

for $Fi$ and $Fj$ which satisfy $\mathrm{Mod}(F_i,\Delta f)=\mathrm{Mod}(F_j,\Delta f)$, when $G_k(F_i)\neq 0$;

$G_m(F_j)=0$, $G_k(F_j)=0$ and $G_m(F_i)=0$ where k, m, i and j are integers which satisfy $k\neq m$ and $i\neq j$, Fi is an ith frequency, Fj is a jth frequency, $\Delta f$ is a reception sampling frequency, and G(F) is a spectrum at the frequency F.

13. A transmitter of a wireless communication system which includes the transmitter and a receiver, the transmitter transmitting a wireless signal produced by allocating data to component carriers for a plurality of communication bands, the receiver receiving the wireless signal and carrying out a reception process for the received wireless signal with a predetermined reception sampling frequency, the transmitter comprising:
a controlling section that controls center frequencies of the component carriers such that, based on the reception sampling frequency, regarding the plural component carriers, the following expressions are satisfied:

for $Fi$ and $Fj$ which satisfy $\mathrm{Mod}(F_i,\Delta f)=\mathrm{Mod}(F_j,\Delta f)$, when $G_k(F_i)\neq 0$;

$G_m(F_j)=0$, $G_k(F_j)=0$ and $G_m(F_i)=0$ where k, m, i and j are integers which satisfy $k\neq m$ and $i\neq j$, Fi is an ith frequency, Fj is a jth frequency, $\Delta f$ is a reception sampling frequency, and G(F) is a spectrum at the frequency F; and
a transmission section that transmits the wireless signal produced by allocating the data to the component carriers having the center frequencies controlled by the controlling section.

14. A receiver of a wireless communication system which includes a transmitter and the receiver, the transmitter transmitting a wireless signal produced by allocating data to component carriers for a plurality of communication bands, the receiver receiving the wireless signal, the receiver comprising:
a reception processing section that carries out a reception process for the received wireless signal with a predetermined reception sampling frequency; and
a controlling section that controls a down convert frequency when the wireless signal is to be down converted such that, regarding the component carriers, the following expressions are satisfied:

for $Fi$ and $Fj$ which satisfy $\mathrm{Mod}(F_i,\Delta f)=\mathrm{Mod}(F_j,\Delta f)$, when $G_k(F_i)\neq 0$;

$G_m(F_j)=0$, $G_k(F_j)=0$ and $G_m(F_i)=0$ where k, m, i and j are integers which satisfy $k \neq m$ and $i \neq j$, Fi is an ith frequency, Fj is a jth frequency, $\Delta f$ is a reception sampling frequency, and G(F) is a spectrum at the frequency F.

* * * * *